United States Patent [19]

MacDonald

[11] Patent Number: 4,562,994
[45] Date of Patent: Jan. 7, 1986

[54] VALVE

[75] Inventor: Robert D. MacDonald, Mesa, Ariz.

[73] Assignee: Brass Craft Manufacturing Company, Southfield, Mich.

[21] Appl. No.: 713,136

[22] Filed: Mar. 18, 1985

[51] Int. Cl.$^4$ .............................................. F16K 25/00
[52] U.S. Cl. ................................... 251/175; 251/182; 251/311; 251/312
[58] Field of Search ............... 251/175, 182, 189, 310, 251/311, 312

[56] References Cited

U.S. PATENT DOCUMENTS

| 2,511,477 | 6/1950 | Mueller | 251/182 |
|---|---|---|---|
| 2,832,562 | 4/1958 | Myers | 251/175 |
| 2,991,972 | 7/1961 | Busby | 251/175 |
| 3,788,602 | 1/1974 | Kitzie | 251/312 |
| 3,915,428 | 10/1975 | Hay | 251/175 |
| 4,003,403 | 1/1977 | Nehring | 251/311 X |
| 4,147,184 | 4/1979 | Jess | 251/312 X |

Primary Examiner—Harold W. Weakley
Attorney, Agent, or Firm—Cullen, Sloman, Cantor, Grauer, Scott & Rutherford

[57] ABSTRACT

Three-piece stop valves, in both angle and straight-through forms, are disclosed comprising a valve body, resilient control sleeve and handle, with no separate fasteners or sealing elements being required. The handle and control sleeve are retained within the valve body by resilient formations on the handle which snap into a retaining groove on the valve body. Inlet line pressure resiliently biases the side walls of the control sleeve into sealing engagement with the valve bore to prevent leakage.

8 Claims, 6 Drawing Figures

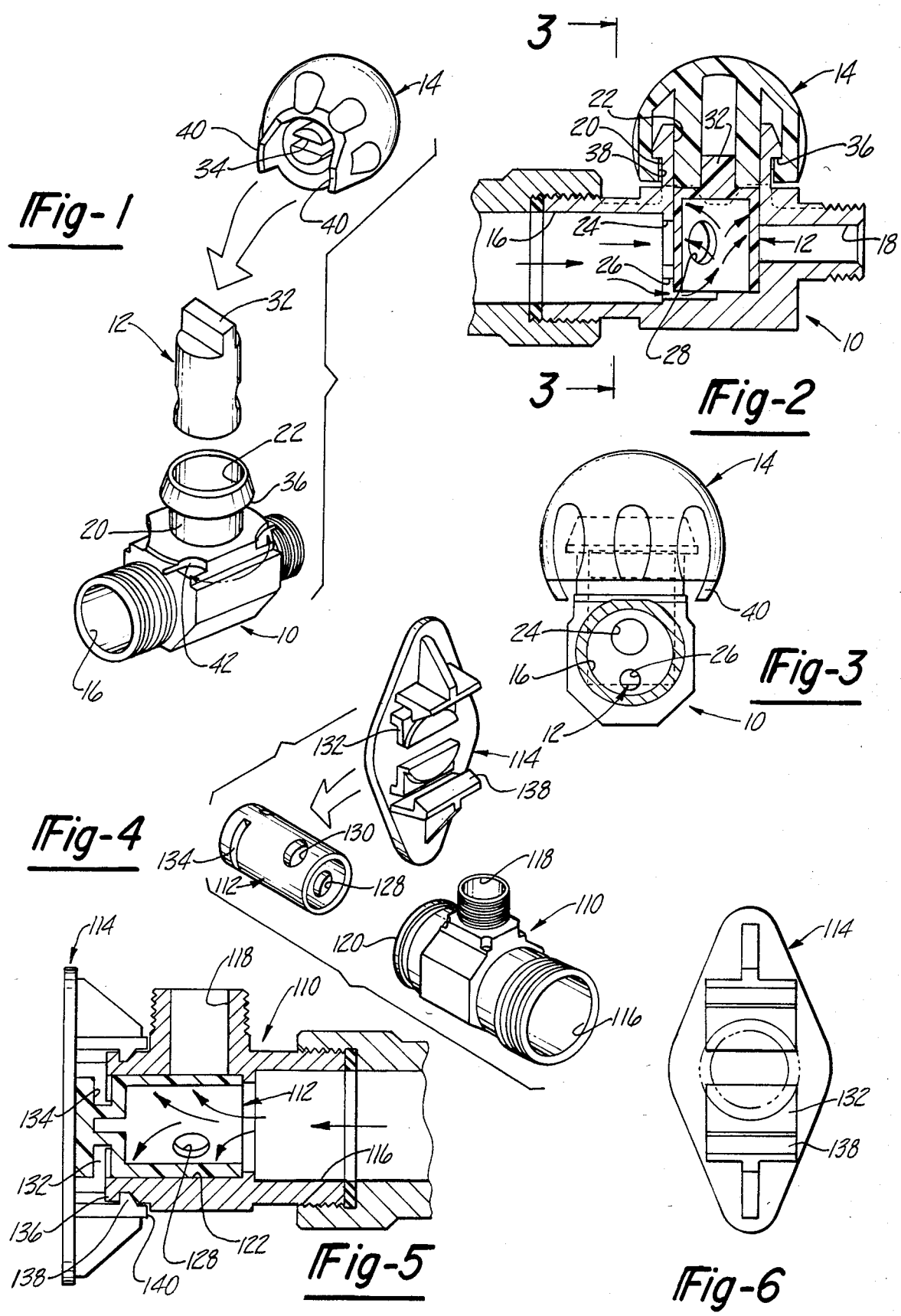

VALVE

BACKGROUND OF INVENTION

This invention relates to stop valves commonly used in water supply lines leading to sinks, toilets and the like. A stop valve is simply a shut-off valve to permit replacement of washers or other repairs to be accomplished on a fixture valve without shutting down an entire plumbing system. The stop valve is commonly located in the fixture supply line between the wall and the fixture. Stop valves are generally available in two basic styles. One style is known as an angle stop valve, wherein the inlet and outlet of the valve are at a right angle to each other. The other standard configuration is a straight-through arrangement wherein the inlet and outlet are coaxially aligned with each other.

The most common type of stop valve construction requires about eight or nine separate pieces. The valve body is typically metal and has externally threaded inlet and outlet openings to receive the conventional conduit connections such as a compression ring and compression nut. The valve body also conventionally has a neck portion which is internally threaded to receive the rotatable valve stem and externally threaded to receive the stem-retaining bonnet. The stem has an annular bib washer which is snapped or screwed onto the inner end and which engages the valve seat within the valve body. The stem-retaining bonnet normally has a washer and packer beneath it to seal the neck around the rotatable and axially moveable valve stem. Finally, the operating handle is normally retained to the valve stem by a screw.

The prior art has sought to simplify the construction of the above-described conventional stop valves by eliminating some of the multiplicity of parts. One modified form replaces the externally threaded valve stem and seat-engaging bib washer with a hollow radially resilient rotatable sleeve which has one or more ports in its cylindrical sidewall. In the off or closed position of the sleeve, line pressure enters the sleeve interior and radially expands the resilient cylindrical side walls of the sleeve to prevent water leakage between the exterior of the sleeve and the bore of the valve body. When the sleeve is rotated by a handle to the open position, the side port of the sleeve becomes circumferentially aligned with the outlet bore of the valve body, permitting flow to be established. In the case of an angle stop valve, the valve body inlet bore is coaxial with the sleeve and in continuous communication with the interior of the sleeve. In the straight-through form of the stop valve, the axis of the sleeve is perpendicular to that of the coaxially aligned inlet and outlet bores of the valve body. There are typically two diametrically opposite ports in the sidewall of the sleeve, to selectively communicate with the inlet and outlet bores of the valve body. Representative prior art patents showing resilient sleeve valve constructions are the U.S. Pat. Nos. to Buffet (329,809), Taft (1,160,342), Richter (2,967,042), Eggers (3,353,785), Christiansen (3,529,621), Redman (4,207,732) and Schrock (4,314,581).

It is the principal object of the present invention to improve the resilient sleeve type of stop valves described in the above-listed prior art patents by further simplifying and reducing the number of components to achieve improved economy of manufacture and reliability of operation.

SUMMARY OF THE INVENTION

The present invention discloses three-piece stop valves in both the angle and straight-through configurations. The three elements consist of the valve body, the resilient sleeve and the handle. Cooperating formations on the outer end of the sleeve and the inner end of the handle eliminate the need for any supplementary connectors or fastening elements. Similarly, cooperating formations on the underside of the handle and on the valve body neck permit the handle to be resiliently snapped into place on the valve body neck and retained thereon without any supplementary fastening or retaining components. No supplementary seals are required.

Two different handle configurations are disclosed, each usable in both the angle and straight-through stop valve configurations. A two-hole sleeve is disclosed which can be used in both valve configurations.

In the straight-through valve configuration a novel valve body construction is disclosed wherein a supplementary fluid passage on the inlet side of the valve body communicates with the open of the valve sleeve to maintain internal pressure within the sleeve when the valve is in its off or closed position.

BRIEF DESCRIPTION OF THE DRAWINGS

FIG. 1 is an exploded perspective view of a straight-through stop valve constructed in accordance with this invention.

FIG. 2 is a cross sectional elevation of the valve of FIG. 1.

FIG. 3 is a transverse cross sectional view in the direction of arrows 3—3 of FIG. 2.

FIG. 4 is an exploded perspective view of a modified form of the invention applied to an angle stop valve.

FIG. 5 is a cross sectional elevational view of the valve of FIG. 4.

FIG. 6 is an end view of the handle portion of FIG. 5.

DETAILED DESCRIPTION OF THE INVENTION

Referring to FIGS. 1–3 of the drawings, a first embodiment of the invention generally comprises a valve body 10, control sleeve 12 and handle 14. Valve body 10 may be conventionally formed as a brass extrusion which is subsequently machined. Control sleeve 12 is formed of a rigid but resilient elastomeric plastic material such as Shell Kraton 7820 (90 Durometer) or Monsanto "Santoprene". The handle may be formed of ABS plastic.

Valve body 10 contains inlet and outlet bores 16, 18, respectively, and an upper neck portion 20 containing sleeve bore 22. As best shown in FIGS. 2 and 3, the inner end of inlet bore 16, at its intersection with sleeve bore 22, terminates in a transverse wall having vertically spaced inlet passage 24 and bypass passage 26.

Control sleeve 12 is open at its bottom end and has two diametrically opposite ports 28, 30 in its cylindrical side wall. Upon rotation of control sleeve 12 by handle 14, ports 28 and 30 can be selectively brought into or out of registry with inlet passage 24 and outlet bore 18. Rotation of handle 14 is transmitted to sleeve 12 by means of driving formation 32 on the upper end of the sleeve, which in snugly received within driving slot 34 on the underside of the central portion of the handle.

The upper neck portion 20 of the valve body 10 has a beveled rim which terminates in a circumferential retaining lip 36 which cooperates with resilient inwardly projecting retaining formations 38 on handle 14, as will be further described below. Downwardly projecting stop flanges 40 on handle 14 engage shoulders 42 on the exterior of valve body 10 to positively stop rotation of the handle and sleeve at the extreme opened and closed positions of the sleeve. The orientation of slot 34 and stop flanges 40 assures that parts 28 and 30 will be properly aligned at assembly.

The outer diameter of sleeve 12 is selected to snugly but slidably received within bore 22 of valve body 10. As shown in FIGS. 2 and 3, which illustrate a position approximately half way between the quarter-turn extremes of full open and full closed, line pressure for inlet bore 16 pressurizes the interior of sleeve 12 by means of bypass passage 28. This internal pressure exerts a radially outward pressure against the cylindrical walls of sleeve 12, assuring that no leakage occurs through sleeve ports 28 and 30 or between the sleeve side walls and sleeve bore 22. When sleeve 12 and handle 14 are rotated to the full open position, sleeve ports 28 and 30 will be fully aligned with inlet passage 24 and outlet bore 18 of valve body 10, establishing direct flow across the sleeve and through the valve.

As a result of the novel handle construction and its means of retention to the valve body through retaining lip 36 and retaining formations 38, no supplementary fastening means are required to secure the handle to the sleeve or the handle-sleeve assembly to the valve body. The resilience of the handle permits the handle to be forced downwardly over retaining lip 36, while the wide lip 36 prevents axially upward hydraullic pressure within the sleeve from forcing the handle and sleeve upward out of sleeve bore 22. The cooperating cylindrical surfaces of the inwardly facing formations 38 and the outer diameter of neck 20 permit rotation of handle 14 without interfering with the axial retaining function of elements 36 and 38.

Referring now to the angle stop embodiment of the present invention illustrated in FIGS. 4-6, corresponding elements carry reference numerals corresponding to those shown in FIGS. 1-3, with the exception that the three-digit reference numerals all begin with the numeral one. As will be seen, the outlet bore 118 is at right angles to the inlet bore 116 of valve body 110. Control sleeve 112 is axially aligned with inlet bore 116 and the open lower or inner end of sleeve 112 is in continuous alignment and direct communication with inlet bore 116. Sleeve 112 may have either one or two ports 128, although only one is required to establish communication between the interior of the sleeve and outlet bore 118 in the open position of the valve. The optional use of a second diametrically opposite port permits the same sleeve to be employed in either a straight-through stop value, such as shown in FIGS. 1-3, or in an angle stop valve as shown in FIGS. 4-6. Also, the second port eliminates the need for careful attention to proper angular orientation of the sleeve at the time of assembly.

While handle 14, such as is illustrated in the embodiment of FIGS. 1-3, could be employed in the embodiment of FIGS. 4-6, an alternative 114 is shown for purposes of illustration. It is to be understood that either form of handle could be used for both the straight-through and angle stop forms of valves the appropriate cooperating formations on the outer end of the respective control sleeves 12, 112. As shown in FIGS. 4-6, the driving formations which cause sleeve 112 to rotate when handle 114 is rotated comprise a pair of inwardly directed flanges 132 on the underside of the handle which are initially assembled to cooperating slots 134 at the outer end of sleeve 112. After this preliminary subassembly is made, the handle-sleeve assembly is axially inserted into sleeve bore 122 of valve body 110. Retaining lip 136 on valve body neck portion 120 cams outwardly the resilient retaining formation 138 of handle 114, until the assembly is fully inserted, whereupon formations 138 are firmly seated beneath retaining lip 136, as in the embodiment of FIGS. 1-3.

Stop portions 140 on the underside of the handle engage stop shoulders 142 on the valve body when the handle and sleeve have been rotated to their full open and full closed position. In both embodiments, only a quarter-turn of the handle and sleeve is necessary to go from the open to closed positions.

The embodiment of FIGS. 4-6 also permits a complete valve to be assembled utilizing only three components, without supplementary seals or fasteners.

Is is contemplated that the novel configuration of the embodiments disclosed herein produce negligible wear and leakage. However, should a problem arise, the low cost of the assembly could permit the entire valve to be disposed of, if desired. In the event that a manufacturer wished to facilitate service rather than disposal of the entire assembly, the handle 114 of the embodiment of FIGS. 4-6 can be readily removed from retaining lip 136 by resiliently bending the outer portion of the handle to a concave shape to thereby expand the gap between retaining formations 138 and permit them to be moved past retaining lip 136.

As a further alternative, it is contemplated that the handle may be formed integrally with the control sleeve, utilizing the handle-retaining means described above.

This invention may be further developed within the scope of the following claims. Accordingly, the above specification is to be interpreted as illustrative of only a few operative embodiments of the present invention, rather than in a strictly limited sense.

I now claim:
1. A plumbing valve comprising:
   a valve body having an inlet bore and an outlet bore;
   a cylindrical resilient control sleeve located within said valve body, said sleeve being open at one axial end and closed at the other axial end, said sleeve having at least one port in its cylindrical side wall;
   said control sleeve having an outer diameter selected to be snugly but rotatably received within a sleeve bore within said valve body, said sleeve bore intersecting said outlet bore and communicating with said inlet bore;
   a handle having connecting formations integrally formed thereon for establishing a rotary driving connection with complementary driving formations integrally formed on said closed other end of said control sleeve for rotating said control sleeve within said sleeve bore;
   said control sleeve being rotatable by said handle between a closed position wherein said side wall blocks communication between said inlet bore and said outlet bore, thereby preventing fluid flow through the valve, and an open position wherein flow-permitting communication is established between said inlet bore and said outlet bore via said port and the interior of said control sleeve;

said valve body and said control sleeve being constructed to maintain continuous communication between said inlet bore and said interior of said control sleeve, to thereby pressurize said interior and resiliently bias said cylindrical side wall radially outwardly against said valve body sleeve bore (1) to aid in establishing a leakage-preventing seal between said side wall and the perimeter of said outlet bore at its intersection with said sleeve bore when said control sleeve is in its closed position, and (2) to aid in establishing a leakage-preventing seal between said side wall and said sleeve bore;

and retaining means integrally formed on said handle for cooperating with complementary retaining means on said valve body for rotatably connecting said handle and said control sleeve to said said valve body without separate fastening elements.

2. The valve of claim 1, wherein said complementary retaining means on said valve body comprise a circumferential groove formed in said valve body adjacent the handle-receiving end of said sleeve bore, and said retaining means on said handle comprising radially resilient projections adapted to snap into said groove when said handle is assembled to said valve body, said groove permitting said radially resilient projections to smoothly ride therein as the handle is rotated during use, while resisting the tendency of hydraulic pressure within the valve body to force said control sleeve and handle axially out of said sleeve bore.

3. The valve of claim 2, wherein a pair of stop surfaces is formed on the exterior of said valve body in positions to be engaged by said handle when said handle has reached predetermined limits of rotation representing fully open and closed positions of the valve.

4. The valve of claim 1, wherein said handle formations and said complementary driving formations on said control sleeve comprise the only connection between said handle and said control sleeve, without any separate fasteners to secure them together.

5. The valve of claim 1, which consists solely of said valve body, said control sleeve and said handle, without any separate sealing or fastening components to secure and seal said three elements together.

6. The valve of claim 1, wherein the axes of said inlet bore and outlet bore are parallel to each other.

7. The valve of claim 6, wherein valve body includes a supplementary passage communicating between said inlet bore and said open end of said control sleeve to permit said interior of said control sleeve to be hydraulically pressurized when said control sleeve is in its closed position.

8. The valve of claim 1, wherein the axes of said sleeve bore and said inlet bore are substantially aligned with each other.

* * * * *